United States Patent
Nishio et al.

(10) Patent No.: US 8,485,158 B2
(45) Date of Patent: Jul. 16, 2013

(54) METHOD TO CONTROL A GAS ENGINE SYSTEM THEREOF

(75) Inventors: Hideki Nishio, Yokohama (JP); Hajime Suzuki, Yokohama (JP); Yuuichi Shimizu, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 789 days.

(21) Appl. No.: 12/597,755

(22) PCT Filed: Nov. 20, 2008

(86) PCT No.: PCT/JP2008/071590
§ 371 (c)(1),
(2), (4) Date: Nov. 19, 2009

(87) PCT Pub. No.: WO2009/078258
PCT Pub. Date: Jun. 25, 2009

(65) Prior Publication Data
US 2010/0126170 A1  May 27, 2010

(30) Foreign Application Priority Data
Dec. 14, 2007  (JP) ................................. 2007-323877

(51) Int. Cl.
*F02M 69/04* (2006.01)

(52) U.S. Cl.
USPC ............................ 123/445; 123/528; 123/495

(58) Field of Classification Search
USPC ................ 123/445, 478, 480, 494, 495, 510, 123/525, 527, 528, 535, 538, 552, 557
See application file for complete search history.

(56) References Cited

U.S. PATENT DOCUMENTS

| 2005/0115226 A1* | 6/2005 | Benz et al. ...................... 60/287 |
| 2006/0059897 A1* | 3/2006 | Benz et al. ...................... 60/286 |
| 2010/0242928 A1* | 9/2010 | Fasold et al. ............. 123/568.12 |

FOREIGN PATENT DOCUMENTS

| JP | 2001132550 A | 5/2001 |
| JP | 2003090266 A | 3/2003 |

(Continued)

OTHER PUBLICATIONS

Korean Office Action for 10-2009-7024652, dated Jul. 25, 2011.

(Continued)

*Primary Examiner* — John Kwon
*Assistant Examiner* — Johnny Hoang
(74) *Attorney, Agent, or Firm* — Kanesaka Berner & Partners, LLP

(57) ABSTRACT

A method to control a gas engine system is disclosed, whereby the engine can be operated with an air-fuel-ratio controlled with high precision, even in using a low calorific fuel-gas that is prone to vary in calorific value; the engine system includes:
 a first gas line toward each cylinder via a first gas valve from a gas supply source line, the first gas valve regulating flow rates of the fuel-gas through a gas compressor on the line;
 a second gas line toward suction air, the line being branched from the gas supply source line and the line being provided with a gas air mixer and a second gas valve on the line.

In the case when the fuel-gas is of a low calorific value or where the output of the engine is high, a part of the fuel-gas is supplied to the engine through the first and second lines. The mixer forms a mixture of a prescribed mixing ratio that is leaner than a lower limit of flammability of the fuel-gas, while the remaining fuel-gas through the first line is supplied to the mixture just before each cylinder so that a final prescribed air fuel ratio is formed.

In the case when the calorific value of the fuel-gas is high, or of high engine output, the whole fuel-gas can be supplied only through the first gas line.

5 Claims, 3 Drawing Sheets

FOREIGN PATENT DOCUMENTS

| | | | |
|---|---|---|---|
| JP | 2006244954 A | 9/2006 |
| JP | 2006249954 A | 9/2006 |
| RU | 19877 U1 | 10/2001 |
| SU | 1377436 A1 | 2/1988 |

OTHER PUBLICATIONS

Chinese Office Action for 200880017493.2, issued Mar. 17, 2011.
Office Action issued in corresponding Russian Application No. 2009143924/06(062471) on Dec. 31, 2010.
Decision of Grant issued to corresponding Russian Application No. 2009143924 (Russian Language).
Decision of Grant issued to corresponding Russian Application No. 2009143924 (English Language).
International Preliminary Report on Patentability—Japanese Language.
International Preliminary Report on Patentability—English Language.

\* cited by examiner

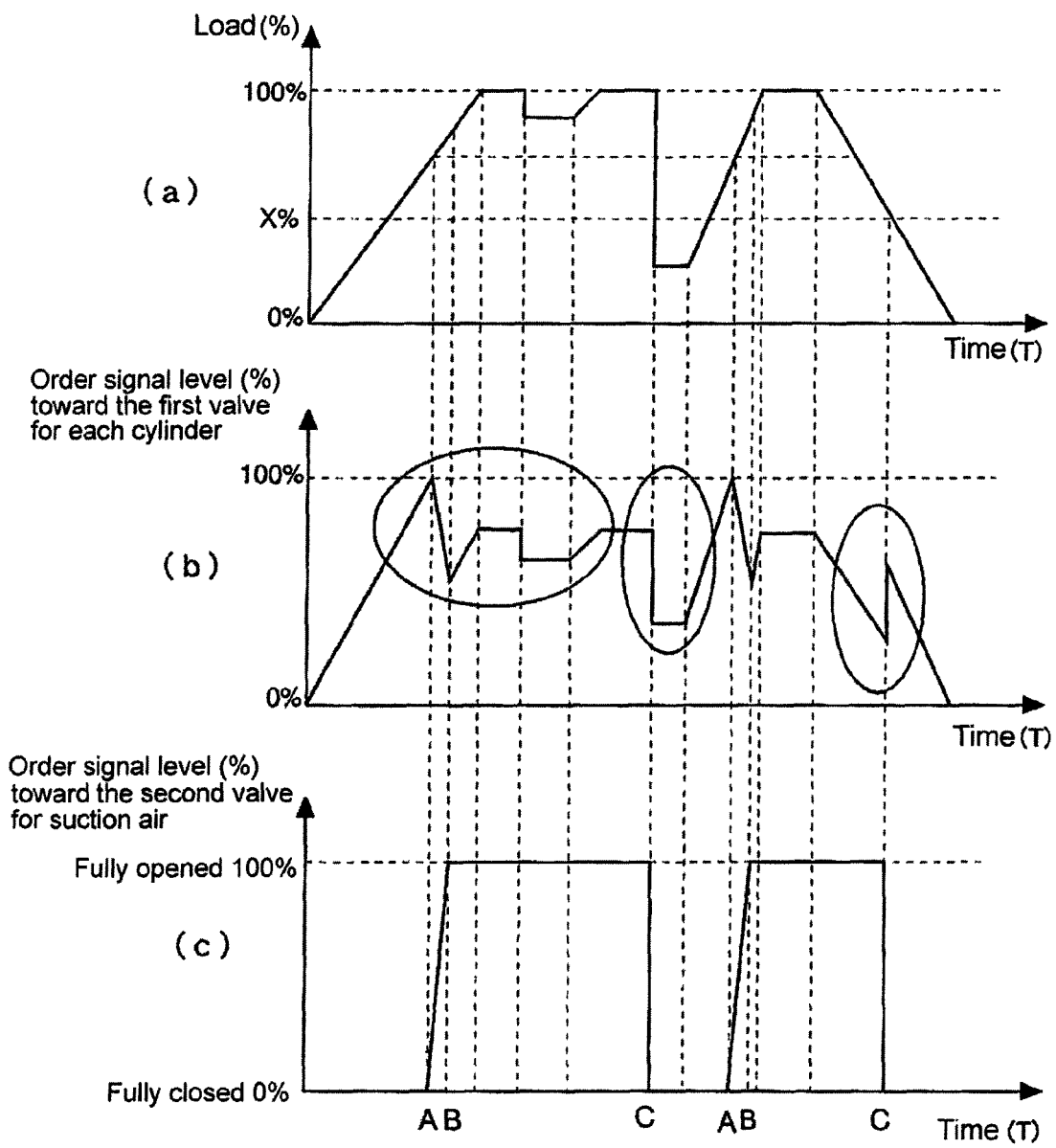

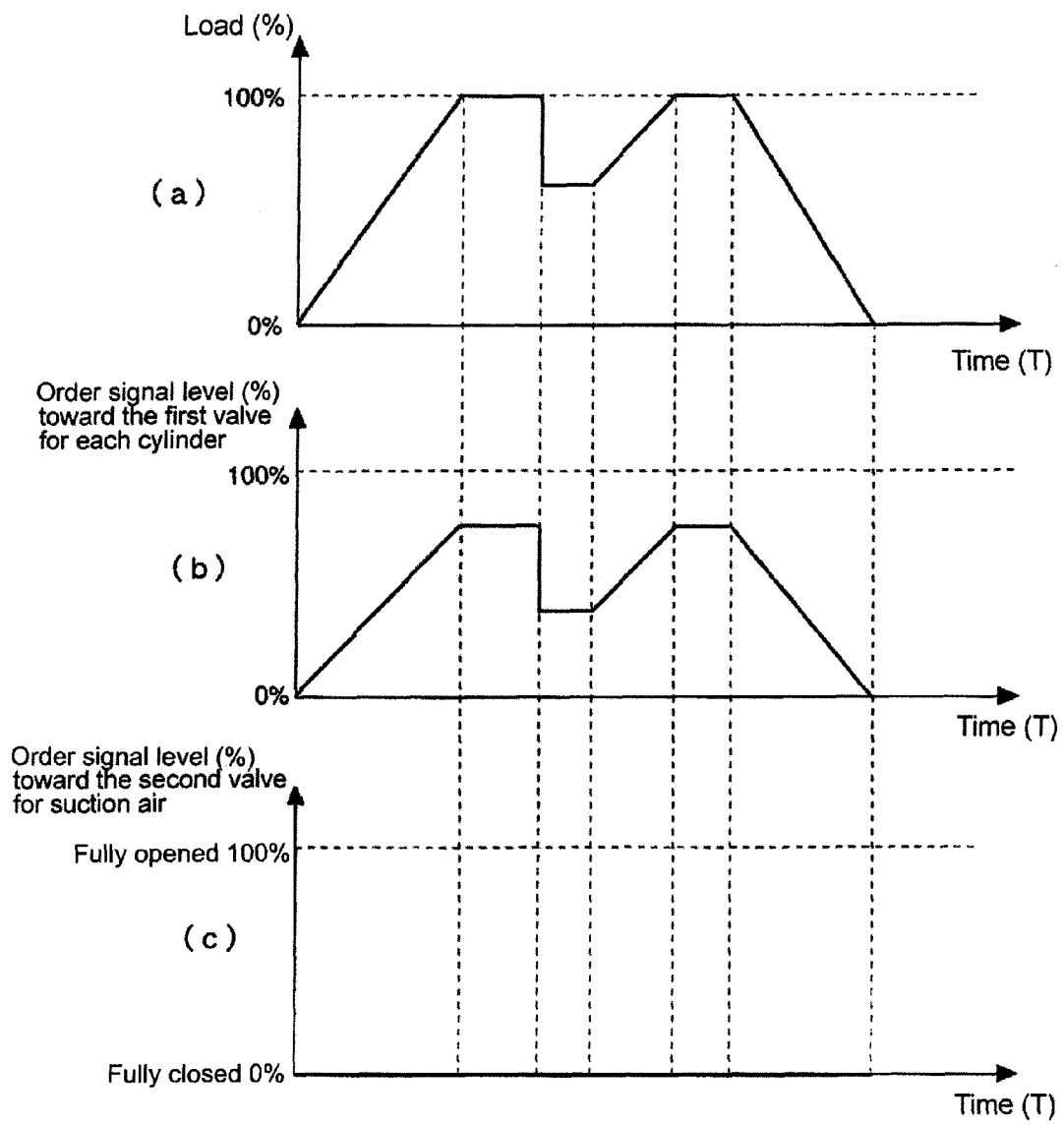

METHOD TO CONTROL A GAS ENGINE SYSTEM THEREOF

CROSS-REFERENCE TO RELATED APPLICATIONS

The present Applications is based on International Application No. PCT/JP2008/071590, filed on Nov. 20, 2008, which in turn corresponds to Japanese Application No. 2007-323877 filed on Dec. 14, 2007, and priority is hereby claimed under 35 USC §119 based on these applications. Each of these applications are hereby incorporated by reference in their entirety into the present application.

BACKGROUND OF THE INVENTION

1. Technical Field

The present application relates to a method to control a gas engine and a gas engine system thereof, the engine being provided with: either a turbocharger or a supercharger through which air is supplied to the engine [henceforth in this application, whenever the word 'turbocharger' appears, it could equally well be replaced by 'supercharger']; a first gas control valve that controls flow-rates of fuel-gas to be supplied to each cylinder of the engine; whereby, the fuel-gas that is regulated by the first gas valve and the air that is supplied through the turbocharger are mixed so as to form a prescribed air-fuel ratio; and, the engine burns the supplied fuel-gas under conditions of the prescribed air-fuel ratio; specifically, the engine can be operated based on the air-fuel-ratio control with high precision, even in the case when a low calorific fuel gas that is prone to vary in calorific value is used.

2. Description of the Related Art

A conventional small gas engine, such as an engine with a cylinder bore of approximately 200 mm or less, usually adopts a fuel-gas mixing system in which fuel-gas and air are mixed upstream of air-inflow before a turbocharger, while the fuel-gas air mixture is supplied to the main combustion chambers i.e. cylinders, through the turbocharger (i.e., a compressor thereof) and an air cooler.

On the other hand, in conventional larger gas engines, fuel-gas is supplied into each cylinder, through a charging air inlet branch arm pipe just before each cylinder and through a gas supply control valve for each cylinder, as fuel-gas supply is required to be uniform all over the cylinders in amount as well as in gas concentration distribution, as a rule. In this manner, not only the air fuel ratios and the fuel quantities over the cylinders can be equalized but also the fuel-gas charging is streamlined; further, since fuel-gas and air are mixed just in front of each cylinder, the length of potentially flammable gas-air-mixture flow that is formed upstream of each cylinder can be shortened so as to enhance engine operational safety against explosion risks.

Hereby, it is noted that the above-mentioned gas supply control valve for each cylinder is also called a first gas valve in this specification; and, the first gas valve is often termed a gas admission valve in the larger gas engine field, because it is the valve which is provided at each cylinder of the gas engine in principle; on the other hand, as described later in this specification, a term, namely, a second gas valve, is introduced for a fuel-gas supply control valve that supplies fuel-gas to suction air. Further, a fuel-gas supply line that is connected to the first gas valve is called a first gas line in this specification; in the same way, a second gas line is defined in response to the second gas valve.

A patent reference 1 (JP2001-132550) discloses a technology in which fuel-gas supply methods of the mentioned smaller and larger gas-engines are combined. In a gas engine according to the reference 1, fuel-gas pressurized by means of a gas compressor is supplied to a cylinder inlet of a charging air passage or a cylinder, whereas fuel-gas that is not compressed by the compressor is supplied to the upstream side of air-inflow line before a turbocharger, from a gas inflow line (a gas source) before the gas compressor; further, the fuel-gas supply can be switched from the line toward the cylinder inlet, to the line toward the upstream side of the air-inflow line before the turbocharger and vice versa.

In the larger gas engine in which fuel-gas is supplied to a cylinder inlet of a charging air passage or a cylinder, it is required that the fuel-gas pressure at the inlet of the cylinder be higher than the supercharged air pressure. As a result, in the case when a low calorific fuel gas i.e. a gas of a low calorific value such as coal mine methane-gas, a gas compressor of a large capacity is needed so as to compress a fuel-gas of low pressure (substantially less than an ambient pressure) and large flow rates.

On the other hand, in a gas engine with a fuel supply system in which fuel-gas is supplied to the upstream side of the air in-flow line before the turbocharger, a flammable air fuel-gas mixture is compressed into a state of high temperature and a high pressure in response to a substantially adiabatic compression process through the turbocharger compressor; hence, potential risks of gas explosion are involved so long as the mentioned fuel supply system is employed.

Against the above backdrop, a patent reference 2 (JP 2006-249954) discloses a technology as to a gas supply device and an operation method thereof for the aforementioned larger gas engines. In the technology according to the reference 2, the fuel-gas device comprises:

a second fuel-gas supply line, i.e. a second gas line, through which a part of fuel-gas is mixed with air that is inducted by the turbocharger compressor;

a first fuel-gas supply line, i.e. a first gas line, through which the remaining part or the whole part of fuel-gas is mixed with air or air-fuel mixture at a gas supply branch arm pipe upstream of each cylinder;

a gas supply control valve, i.e. a second gas valve, for suction air, the valve regulating fuel-gas amount (flow rates) to be supplied through the turbocharger compressor;

a gas supply control valve, i.e. a first gas valve, for each cylinder, the valve regulating fuel-gas amount (flow rates) to be supplied through the gas supply branch arm pipe upstream of each cylinder;

a gas (fuel-gas) compressor that is provided at the upstream side of the first fuel-gas supply line;

whereby the amount (flow rates) of the fuel-gas through the second gas line is controlled by means of regulating opening levels of the second gas valve for suction air, so that the concentration of the supplied fuel-gas in the air fuel-gas mixture that flows through the turbocharger compressor is kept below the lower (lean) limit of flammability as to the fuel-gas.

According to the above disclosure, potential risks of fuel-gas explosion that may occur in the neighborhood of the turbocharger compressor outlet are completely eliminated; further, the size and capacity of the gas (fuel-gas) compressor that compresses fuel-gas and supplies the fuel-gas to the gas supply branch arm pipe upstream of each cylinder can be reduced because of reduced power consumption, even in the case when a fuel gas with a low calorific value is used.

Hereby, it should be noted in addition that the patent reference 2 utilizes a technology originated from larger gas engines that are provided with first gas valves in principle, whereas small gas engines are not provided with a first gas valve fitted to each cylinder in general; namely, a small gas engine includes a gas valve that supplies fuel-gas toward the air suction line of the engine. The gas valve that supplies fuel-gas toward the air suction line is termed a second gas valve in this specification.

Further, it is also noted that the entire contents of the patent reference 2 (Application No. JP 2006-249954 filed on Mar. 8, 2005 with Japanese Patent Office) are hereby incorporated by reference.

As described above, according to the reference 2, a gas engine can be realized, whereby a sufficient amount (flow rates) of fuel-gas can be secured and in addition, the fuel-gas compressor can be of a smaller size and capacity. However, a further advanced technology has been anticipated, whereby fuel-gas amount (flow rates) through the second gas line toward the turbocharger compressor can be precisely controlled with a simple mechanism, and the further advanced technology can provide a control method to be applied even to the case where the calorific value of the fuel-gas continuously varies.

SUMMARY OF THE INVENTION

In view of the above-stated conventional technology and anticipated solutions thereof, the present disclosure is aiming at providing a method to control a gas engine and a gas engine system thereof, whereby high precision control of the air fuel ratio can be achieved even in the case when a low calorific value fuel gas that is prone to vary in calorific value is used.

In order to achieve the goals as mentioned, the present specification discloses a method to control a gas engine that ignites and burns fuel-gas, the gas engine comprising:

a turbocharger that pressurizes ambient air and supplies the air to the engine, namely, to a plurality of cylinders;

a first gas line toward the cylinders, the line communicating a gas supply branch arm pipe that is provided upstream of each cylinder, with a gas supply source line;

a first gas valve for each cylinder, each valve being fitted on the gas supply branch arm pipe and being able to regulate the flow rate of the fuel-gas into each cylinder;

whereby the fuel-gas through the first gas line and the air through the turbocharger are mixed to form an air gas mixture;

and, in the case when the fuel-gas is of a low calorific value, or in the case when the engine is being operated at more than half load), the engine further comprising:

a second gas line toward the turbocharger the line which is branched from the gas supply source line;

a second gas valve for suction air the valve which is provided on the second gas line toward the turbocharger, and is regulated with on-off movements;

an air gas mixer that is provided on the upstream air inflow line of the turbocharger, and mixes the fuel-gas through the second gas line with the ambient air inducted toward the turbocharger;

whereby the fuel-gas and the air are mixed so as to form a mixture of a prescribed ratio that is leaner than a lower limit of flammability as to the fuel-gas, and the air fuel-gas mixture is supplied to the turbocharger, while the remaining fuel-gas that is not supplied to the mixer from the gas supply source line is sent to each cylinder through the gas compressor and through the first gas line toward each cylinder, so that a prescribed air fuel ratio is formed in each cylinder by regulating the first gas valve for each cylinder;

and, in the case when the fuel-gas is of a high calorific value, or in the case when an output of the engine is low, the second gas valve for suction air is closed so that the whole of the fuel-gas from the gas supply source line is directed toward each cylinder through the first gas line.

According to the present invention, a part of the fuel-gas can be supplied to the engine suction air that is inducted by the turbocharger, in the case when the fuel-gas amount to be supplied is large as is the case when the fuel-gas is of a low calorific value, or the engine output is high; thus, an air fuel ratio control with precision can be realized, while necessary fuel amount is secured. In other words, the engine is provided with a mixer that mixes fuel-gas with the induced air so that the concentration of the fuel air mixture is smaller than a prescribed concentration below a lean limit of flammability as to the fuel-gas; thus, the fuel-gas compressor that is arranged on the first gas line toward each cylinder can be of a smaller size and capacity; further, potential fuel-gas explosion risks in the air supply passage can be removed; what is more, since the mixer yields an air fuel mixture of a prescribed concentration, the air fuel control at the first gas valve for each cylinder can be simplified.

Moreover, in another aspect of the present invention, an opening level of the aforementioned first gas valve as well as an output of the engine is detected during operation so that the second gas valve for suction air is opened with an estimation that the fuel gas is of a low calorific value or the higher output of the engine is being required, in the case when the first gas valve for each cylinder is fully opened and the output of the engine is increasing.

In this way, whether or not the fuel-gas supply through the mixer is necessary can be simply and pertinently judged; thus, an air fuel control with precision can be realized.

In another aspect of the present invention, the second gas valve for suction air is closed with an estimation that the fuel-gas served for operation has changed into a fuel of a high calorific value or the output of the engine is reduced, in the case when the detected output of the engine becomes low and less than a prescribed value.

In this way, an upper threshold value as to a maximum controllable fuel-gas flow rate is predetermined; and, in the case when a fuel-gas flow rate becomes less than the upper threshold value as a prescribed value, the second gas valve for suction air is closed and the whole fuel-gas flow rate is regulated only by means of the first gas valve for each cylinder. Thus, the fuel-gas flow rate can be simply controlled with precision.

Further, the present invention discloses a control device of an engine that is provided with not only the first gas valve for each cylinder but also a charging air flow-rate control valve such as an exhaust gas by-pass valve that controls the flow rate of the charged air through the turbocharger into the cylinder's, whereby the first gas valve for each cylinder acts as a fuel-gas injector for injecting fuel-gas into the charged air so that air fuel mixture of a required air fuel ratio is supplied into each cylinder; wherein, the control device is further provided with: a second gas line toward suction air before the turbocharger the line which is branched from the gas supply source line so as to be connected to the air inflow line toward the turbocharger compressor, the line comprising a second gas valve for suction air, of on-off control; a gas supply line to the cylinders the line which is branched from the gas supply source line, the line comprising a gas compressor that pressurizes fuel-gas so that the fuel-gas can flow into the boosted charging air; a mixer that is provided on the upstream air inflow line toward the turbocharger, and mixes the fuel-gas through the second gas line, with the ambient air induced toward the turbocharger so that the concentration of the air fuel mixture is kept lower than a prescribed concentration below a lean limit of flammability as to the fuel-gas;

Further, it is preferable that the mentioned mixer is of a venturi type, and the air and the fuel-gas are mixed so that the prescribed air fuel ratio can be achieved.

As described above, the present invention can provide a method to control a gas engine and a gas engine system thereof, whereby an air fuel ratio control with high precision can be achieved even in the case when a low calorific fuel gas that is prone to vary in calorific value is used.

To be more specific, an air fuel ratio control with precision can be realized, while necessary fuel amount is secured, in a manner that a part of the fuel-gas is supplied to the engine suction air that is inducted by the turbocharger, only in the case when the fuel-gas amount to be supplied is being increased as is the case when the fuel-gas is of a low calorific value, or the engine output is high. In other words, the gas compressor can be of a smaller size and capacity by means of providing a mixer that mixes fuel-gas with suction air so that the concentration of the air fuel mixture does not exceed a prescribed concentration value below a lean limit of flammability as to the fuel-gas, as well as by means of supplying fuel-gas through the mixer in the case when a larger amount of fuel-gas is required; further, potential fuel-gas explosion risks in the air supply passage can be removed; what is more, since the mixer yields an air fuel mixture of a prescribed concentration, the air fuel control at the first gas valve for each cylinder can be simplified.

Moreover, whether or not the fuel-gas supply through the mixer is necessary can be simply and pertinently judged in this invention, and the second gas valve for suction air is scheduled to be opened in response to the judgment in the case when the first gas valve for each cylinder is fully opened and the output of the engine is being increased; thus, an air fuel control with precision can be realized.

In addition, in the case when the engine output is lowered below a prescribed value, then, the second gas valve for suction air is closed; this also serves to achieve simple and precise control according to this invention.

BRIEF DESCRIPTION OF THE DRAWINGS

The present invention will now be described in greater detail with reference to the preferred embodiments of the invention and the accompanying drawings, wherein:

FIGS. 2a, 2b, and 2c show a diagram for controlling fuel gas supply according to the embodiment; and FIGS. 3a, 3b, and 3c show a diagram for controlling fuel gas supply according to the conventional technology.

Figure 1:
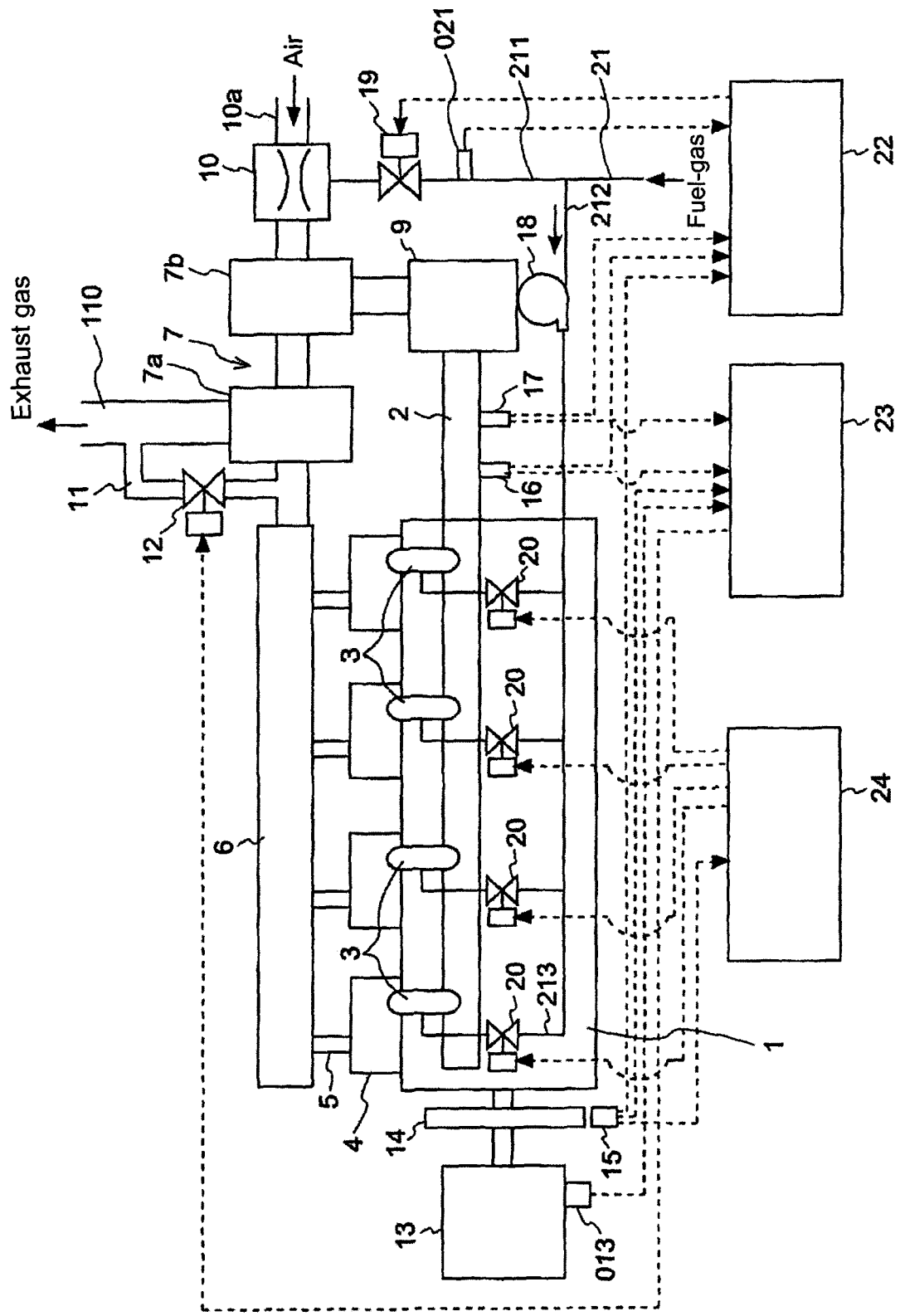
FIG. 1 shows a two-dimensional schematic drawing of a gas engine system as an embodiment according to the present invention.

It is noted that a related conventional technology is depicted not in the first place but in FIGS. 3a, 3b, and 3c, as the conventional technology can be simply explained in contrast to the presented embodiment, i.e., the preceding figures.

DETAILED DESCRIPTION OF THE INVENTION

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

As described above, FIG. 1 shows a two-dimensional schematic drawing of a gas engine system as an embodiment according to the present invention; FIG. 2 shows a diagram for controlling fuel gas supply according to the embodiment; and FIG. 3 shows a diagram for controlling fuel gas supply according to the conventional technology.

Hereupon, an explanation is given about a gas engine configuration, for an example, with a supercharged gas engine for driving a generator the engine which comprises a pre-chamber for ignition; however, the applications of the present invention are not confined to this example. In practical terms, the gas engine may be one without a pre-chamber. As depicted in FIG. 1, a generator 13 is a driven load as a preferable example; as a matter of course, a driven load is not limited to a generator.

With reference to FIG. 1, the two-dimensional schematic drawing of a gas engine system will be explained. In the figure, the component with Numeral 1 is an engine (a gas engine);

Numeral 4 shows a cylinder cover for each cylinder of the engine 1;

Numeral 13 shows a generator driven directly by the engine 1;

Numeral 14 shows a flywheel;

Numeral 7 shows a shaft by which an exhaust gas turbine 7a drives a compressor 7b;

Numeral 3 shows a charging air inlet branch arm pipe that is connected to the charge inlet of each cylinder cover 4;

Numeral 2 shows a charging air manifold that connects the charge outlet of the compressor 7b with the charging air inlet branch arm pipe 3;

Numeral 9 shows an air cooler that cools the charging air passing through the charging air manifold 2.

Further,

Numeral 5 shows an exhaust gas branch arm pipe that is connected to the exhaust outlet of each cylinder cover 4;

Numeral 6 shows a main exhaust manifold, namely a concentrated volume for exhaust gas, the volume being introduced for what is called a constant super-charging system;

Numeral 110 shows an exhaust gas outlet pipe through which engine exhaust gas is discharged from the outlet of the exhaust gas turbine 7a to the atmosphere;

Numeral 11 shows an exhaust gas by-pass pipe that diverges from the inlet of the exhaust gas turbine 7a, bypasses the exhaust gas turbine 7a, and is connected to the exhaust gas outlet pipe 110 on the outlet side of the turbine 7a.

Numeral 12 shows an exhaust gas by-pass valve the throat area of which is variable;

Numeral 10a shows an air inlet passage toward the turbocharger through which ambient air is inducted toward the cylinders via the turbocharger compressor 7b;

Numeral 10 shows a gas-air mixer that is provided part way along the air inlet passage 10a toward the turbocharger;

Numeral 21 shows a gas supply source line through which fuel gas from a fuel-gas reservoir (not shown) is supplied to the engine, whereby a second gas line 211 toward suction air induced by the turbocharger or toward the gas air mixer, as well as a first gas line 212 toward each cylinder are branched from the gas supply source line 21.

In relation to the above, the second gas line 211 is connected to the air-gas mixer 10 that is provided part way along the air inlet passage 10a toward the turbocharger, while the first gas line 212 branches, part way along the first gas line, toward a gas supply branch arm pipe 213 at each cylinder, the pipe 213 being connected to the charging air inlet branch arm pipe 3. The gas-air mixer is capable of supplying fuel-gas into the suction air so that the concentration of the air fuel mixture is kept lower than a prescribed concentration below a lean limit of flammability as to the fuel-gas; preferably, a mixer of a venturi type is used.

In FIG. 1, Numeral 18 shows a gas compressor that is provided on the line 212, and pressurizes the fuel-gas so that the fuel-gas passing through the line 212 can flow into the boosted charging air;

Numeral 19 shows a second gas valve for suction air, on the second gas line 211; this second gas valve controls fuel-gas flow through the line 211, with on-off (open-close) movements; Numeral 20 shows a first gas valve which is provided on the gas supply branch arm pipe to each cylinder; the fuel-gas flow through each valve 20 is controlled by varying its throat area so as to regulate the fuel-gas flow rate to each individual cylinder of the engine.

Further, Numeral 15 shows an engine speed sensor that measures the rotational speed of the engine-generator; Numeral 013 shows a load sensor, namely, an engine load sensor; Numeral 17 shows a charging air pressure sensor that measures the pressure at the charging air manifold 2; Numeral 16 shows a charging air temperature sensor that measures the temperature at the charging air manifold 2; Numeral 021 shows a flow meter that measures the fuel-gas flow rate through the second gas line 211.

Still further, Numeral 24 denotes an engine speed controller; Numeral 23 denotes an air-fuel ratio controller; Numeral 22 denotes a gas quantity controller; whereby, a detected engine speed signal from the engine speed sensor 15 is outputted to the engine speed controller 24, the air-fuel ratio controller 23, and the gas quantity controller 22;

a detected engine load signal from engine load sensor 013 is outputted to the air-fuel ratio controller 23;

a detected charging air pressure signal from charging air pressure sensor 17 is outputted to the air-fuel ratio controller 23 and the gas quantity controller 22;

a detected fuel-gas flow rate signal from the flow meter 021 is outputted to the gas quantity controller 22.

The engine speed controller 24 is generally an electric governor, and the controller regulates opening levels of the first gas valve 20 for each cylinder, as a feedback response to the detected engine speed signals from the engine speed sensor 15.

The air-fuel ratio controller 23 regulates opening levels of the exhaust gas by-pass valve 12, with a means described later, in response to the detected engine speed signals from the engine speed sensor 15, the detected load signals from the load sensor 013, the detected charging air pressure signals from the charging air pressure sensor 17, and the detected charging air temperature signals from the charging air temperature sensor 16.

During the gas engine operation, the fuel-gas from the gas supply (source) line 21 flows into the line 212, or flows into the lines 212 and 211. The second gas line 211 leads fuel-gas to the gas-air mixer 10 where the fuel-gas is mixed with the air flowing along the air inlet, passage 10a toward the turbocharger; whereby, the air fuel mixture is inducted into the turbocharger compressor 7b. The mixture is pressurized into a state of high pressure and temperature, by a substantially adiabatic compression process through the turbocharger compressor 7b; the mixture is cooled by the air cooler 9 and flows into the charging air inlet branch arm pipes 3 after passing through the charging air manifold 2.

The fuel-gas that flows into the line 212, namely, the first gas line 212, is compressed by the gas compressor 18; then, after passing through each gas supply branch arm pipe 213 to the engine cylinders, the fuel-gas flows to the charging air inlet branch arm pipes 3 and is mixed with the air or the before-described air fuel mixture through the charging air manifold 2.

On the other hand, the exhaust gas from the cylinders of the engine 1 flows through the exhaust gas branch arm pipes 5, and enters the main exhaust manifold; then, the exhaust gas is led to the exhaust gas turbine 7a; and after driving the compressor 7b, the exhaust gas is discharged to the atmosphere through the exhaust gas outlet pipe.

Further, when the exhaust gas by-pass valve 12 is opened in response to a control-order signal from the air-fuel ratio controller 23 in a manner as described later, then a part of the exhaust gas in the main exhaust manifold bypasses the exhaust gas turbine 7a, and is released directly toward the exhaust gas outlet pipe 11.

With reference to the engine configuration stated thus far, the engine control method will now be described in detail.

In the first place, a conventional control method as a contrasting example for the present invention is explained with FIGS. 3a to 3c. FIG. 3a shows a load transition as to a conventional engine; FIG. 3b shows a transition as to an order signal that is transmitted to the first gas valve for each cylinder; and, FIG. 3c shows a transition as to an order signal that is transmitted to the second gas valve for suction air. As shown in FIGS. 3a, 3b, and 3c, in the conventional control method, the opening levels of the first gas valve for each cylinder are controlled in response to the engine load levels so as to regulate the gas flow rates. Thus, in the conventional way whereby the second gas valve for suction air is not provided, only the first gas valve for each cylinder controls fuel amounts for each cylinder; namely, the conventional way corresponds to a manner in which the fuel order signal toward the second gas valve for suction air is always null in the embodiment of FIG. 1.

On the other hand, FIGS. 2a, 2b, and 2c explain a control method as an embodiment of this invention.

FIG. 2a shows a load transition as to the engine according to an embodiment of this invention; FIG. 2b shows a transition as to an order signal that is transmitted to the first gas valve for each cylinder; and, FIG. 2c shows a transition as to an order signal that is transmitted to the second gas valve for suction air. In the embodiment as shown in FIGS. 2a, 2b, and 2c, the second gas valve for suction air is opened in the case when the fuel-gas is of a low calorific value, or the engine output is high; and, fuel-gas is supplied to the engine both through the second gas valve for suction air and through the first gas valve for each cylinder. In the case when the fuel-gas is of a high calorific value, or in the case when the output of the engine is low, the second gas valve for suction air is closed; and, fuel-gas is supplied only through the first gas valve for each cylinder.

To be more specific, the opening levels of the first gas valve for each cylinder and the load levels of the engine are detected; and, the second gas valve for suction air is opened, in the case when the opening levels of the first gas valve for each cylinder are full (i.e., 100%) or nearly full (i.e., more than a predetermined level) and the load levels of the engine are increasing as shown in the neighborhood of a time point A in FIG. 2c. Further, an air fuel mixture of a predetermined air fuel ratio is achieved at the before-mentioned mixer; in addition, the opening levels of the first gas valve for each cylinder are regulated so that the air fuel ratio of an air fuel mixture just before each cylinder is at a predetermined level (a final air fuel ratio as to an air fuel mixture that is burned in each cylinder). In this connection, it is noted that the opening levels of the first gas valve for each cylinder are lowered from a full level, while the opening levels of the second gas valve for suction air are full (100%) or near full, for example, during a time process from a time point A to a time point B in FIG. 2c.

Further, the first gas valve for each cylinder regulates fuel-gas flow rates with regard to the levels of the engine load, while the second gas valve for suction air is fully (100%) opened; whereby, an air fuel mixture of a predetermined air fuel ratio the mixture which includes air inducted by the turbocharger, and fuel supplied through the first gas valve for each cylinder are mixed just before each cylinder so that a predetermined air fuel ratio for a final air fuel mixture is achieved. Hereby, it is reconfirmed that a final air fuel mixture means the air fuel mixture that is burned in each cylinder.

Still further, under the condition that the second gas valve for suction air is opened and the levels of the engine load are detected, when the detected level of the engine load becomes less than a predetermined level, then the second gas valve for suction air is closed and the air fuel ratio control is performed only by the first gas valve for each cylinder, on the basis that the fuel-gas being used has a high calorific value or the output of the engine becomes low; this situation is depicted around a time point C in FIG. 2c.

As described above, the maximum flow rate as a threshold value of the second gas valve for suction air is calculated in advance; and, when the flow rate through the mentioned valve becomes lower than or equal to the threshold value, then the second gas valve for inducted air is closed and only the first gas valve for each cylinder regulates the fuel flow rate. Thus, a simple control with precision can be achieved.

In the embodiment as described above, by means of the manner that fuel gas is supplied to the suction air induced by the turbocharger only in the case when the fuel-gas supply is greater than at a predetermined rate, as is the case when the fuel-gas is of a low calorific value or the engine output is high, the required fuel gas supply is achieved with precision. Further, the described-embodiment is provided with a gas mixer that achieves a fuel gas mixture with a concentration below a lean limit of flammability as to the fuel-gas; and, a part of the required amount of fuel-gas is supplied through the mixer in the case when a larger fuel flow rate is needed; thus, the size and capacity of the gas compressor can be reduced; further, potential fuel-gas explosion risks in the air supply passage can be removed; what is more, since the mixer yields an air fuel mixture of a prescribed concentration, the air fuel control at the first gas valve for each cylinder can be simplified.

Moreover, since whether or not the fuel-gas supply through the mixer is necessary can be simply and pertinently judged in the described embodiment, and the second gas valve for suction air is scheduled to be opened in response to the judgment in the case when the first gas valves for each cylinder are fully opened and the output of the engine is increasing, an air fuel control with precision can be realized.

In addition, in the case when the output of an engine is lowered below a prescribed value, then, the second gas valve for suction air is closed; serving as a simple and precise control.

INDUSTRIAL APPLICABILITY

The described embodiment provides a gas engine comprising:
a first fuel-gas supply system in which fuel-gas is mixed with suction air inducted by a turbocharger of the engine and the fuel air mixture is fed to the engine through the turbocharger;
a second fuel-gas supply system in which fuel-gas is supplied to a charge air passage of each cylinder;
whereby potential fuel-gas explosion risks in the air supply passage, at the outlet of a turbocharger compressor, can be removed;

moreover, in the case when fuel-gas of a low calorific value is used, less power is needed to drive the gas compressor than would otherwise be required, the gas compressor being provided in the second fuel-gas supply system for pressurizing the fuel-gas to the charge air passage of each cylinder;
further, the size and capacity of the gas compressor is less than would otherwise be required.

Thus, the embodiment disclosed in this specification is useful as an industrial technology.

The invention claimed is:

1. A method of controlling a gas engine that ignites and burns fuel-gas, the gas engine including a turbocharger that pressurizes ambient air and supplies the air to the gas engine to a plurality of cylinders; a gas supply source line, a first gas line having a branch line connected to each cylinder; a first gas valve for each cylinder, the first gas valve being fitted on the branch line to regulate a flow rate of the fuel-gas toward each cylinder; and a gas compressor on the first gas line that compresses-the fuel-gas toward the first gas valve so as to mix the fuel-gas through the first gas line and the air through the turbocharger to form an air fuel-gas mixture, said method comprising:
when the fuel-gas is of a low calorific value, or when an output of the engine is high,
providing a second gas line toward suction air before the turbocharger, said second gas line being branched from the gas supply source line,
providing a second gas valve for the suction air on the second gas line toward the suction air before the turbocharger, and regulating the second gas valve with on-off movements;
providing an air gas mixer on the upstream air inflow line of the suction air toward the turbocharger, and mixing the fuel-gas through the second gas line with the ambient air induced toward the turbocharger so as to form an air fuel-gas mixture of a prescribed mixing ratio that is less than a lower limit of flammability of the fuel-gas, and wherein the remaining fuel-gas that is not supplied to the mixer from the gas supply source line is sent to each cylinder through the gas compressor and through the first gas line toward each cylinder, so that a prescribed air fuel ratio is formed in each cylinder by regulating the first gas valve; and
when the fuel-gas is of a high calorific value, or when an output of the engine is low, closing the second gas valve for suction air so that the whole fuel-gas from the gas supply source line is directed toward each cylinder through the first gas line.

2. The method according to claim 1, wherein the second gas valve is opened with an estimation that the fuel gas is of a low calorific value or the higher output of the engine is being required, when the first gas valve for each cylinder is fully opened and the output of the engine is increasing.

3. The method according to claim 1, wherein the second gas valve for the suction air is closed with an estimation that the fuel-gas served for operation has changed into a fuel of a high calorific value or the output of the engine is reduced, when the detected output of the engine becomes low and less than a prescribed value.

4. A gas engine of a gas engine system for igniting and burning fuel-gas, the gas engine comprising:
a turbocharger configured to pressurize ambient air and to supply air to the gas engine to a plurality of cylinders;
a charging air flow-rate control valve configured to control a flow rate of the charged air through the turbocharger into the cylinders;

a first gas line toward the cylinders, the first gas line communicating a gas supply branch arm pipe that is provided in front of each cylinder, with a gas supply source line;

a first gas valve for each cylinder configured to inject fuel-gas into the air boosted by the turbocharger, in front of each cylinder, so that the first gas valve is configured to inject a prescribed amount of fuel-gas so as to produce a to-be-burnt air fuel-gas mixture of a prescribed air fuel mixture;

a gas compressor that is provided on the first gas line and is configured to compress the fuel-gas in the first gas line toward the first gas valve;

a second gas line toward suction air before the turbocharger and branched from the gas supply source line;

a second gas valve for the suction air provided on the second gas line toward the suction air before the turbocharger, and configured to be regulated with on-off movements; and an air gas mixer that is provided on an upstream air inflow line of the suction air toward the turbocharger, and is configured to mix the fuel-gas through the second gas line with the ambient air induced toward the turbocharger, wherein the fuel-gas and the air are adapted to be mixed by the air gas mixer so as to form an air fuel-gas mixture of a prescribed mixing ratio that is less than a lower limit of flammability of the fuel-gas, and the remaining fuel-gas that is not supplied to the mixer from the gas supply source line is adapted to be sent to each cylinder through the gas compressor and through the first gas line toward each cylinder to obtain a prescribed air fuel ratio in each cylinder by regulating the first gas valve for each cylinder.

5. The gas engine according to claim 4, wherein the air gas mixer is of a venturi type, the mixer configured to mix the suction air with the fuel-gas through the second gas valve and the second gas line to obtain the air fuel-gas mixture of the prescribed air fuel-gas ratio.

* * * * *